US011542568B2

(12) United States Patent
Choi

(10) Patent No.: US 11,542,568 B2
(45) Date of Patent: Jan. 3, 2023

(54) HEAT TREATMENT APPARATUS FOR VEHICLE BODY COMPONENT

(71) Applicants: HYUNDAI MOTOR COMPANY, Seoul (KR); KIA MOTORS CORPORATION, Seoul (KR)

(72) Inventor: Hyeon-Cheol Choi, Yongin-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 79 days.

(21) Appl. No.: 17/144,661

(22) Filed: Jan. 8, 2021

(65) Prior Publication Data
US 2022/0033922 A1    Feb. 3, 2022

(30) Foreign Application Priority Data
Jul. 28, 2020   (KR) .................. 10-2020-0093488

(51) Int. Cl.
*C21D 9/00*    (2006.01)
*C21D 1/42*    (2006.01)
*C21D 1/667*   (2006.01)
*B21D 53/88*   (2006.01)

(52) U.S. Cl.
CPC .......... *C21D 9/0068* (2013.01); *B21D 53/88* (2013.01); *C21D 1/42* (2013.01); *C21D 1/667* (2013.01); *C21D 9/0062* (2013.01); *C21D 2221/00* (2013.01)

(58) Field of Classification Search
CPC .......... B21D 53/88; C21D 1/42; C21D 1/667; C21D 2221/00; C21D 9/0062; C21D 9/0068

USPC .................................. 266/115, 129
See application file for complete search history.

(56) References Cited

U.S. PATENT DOCUMENTS

| | | | | |
|---|---|---|---|---|
| 3,584,487 A * | 6/1971 | Carlson | ............... | H05B 6/14 72/364 |
| 8,230,713 B2 * | 7/2012 | Krajewski | ............. | B21D 37/16 72/350 |
| 9,168,578 B2 * | 10/2015 | Yoon | .................... | B21D 22/022 |
| 10,697,035 B2 * | 6/2020 | Sohmshetty | ......... | C21D 9/0062 |

(Continued)

FOREIGN PATENT DOCUMENTS

KR   10-2017-0030394 A   3/2017

*Primary Examiner* — Jessee R Roe
*Assistant Examiner* — Michael Aboagye
(74) *Attorney, Agent, or Firm* — Lempia Summerfield Katz LLC

(57) ABSTRACT

An heat treatment apparatus for a vehicle body component includes, a jig base, a lower fixed die fixedly installed on the jig base and supporting the vehicle body component that is press-molded into a predetermined shape, a heating unit installed on the lower fixed die and locally heating the vehicle body component, a plurality of side movable dies that can move reciprocally disposed at both sides of the lower fixed die, installed on the jig base, and selectively combinable with the lower fixed die, a cooling unit installed on each side movable die and cooling a heating portion of the vehicle body component, and an upper movable die that can move reciprocally in the up and down direction correspondingly to the lower fixed die, and configured to clamp the vehicle body component through the lower fixed die and at least one of the side movable dies combined together.

14 Claims, 15 Drawing Sheets

(56) References Cited

U.S. PATENT DOCUMENTS

2015/0266076 A1\* 9/2015 Ueda .................. B21D 37/16
  72/342.3
2017/0066034 A1\* 3/2017 Yang .................. H05B 6/101

\* cited by examiner

HEAT TREATMENT APPARATUS FOR VEHICLE BODY COMPONENT

CROSS-REFERENCE TO RELATED APPLICATION

This application claims priority to and the benefit of Korean Patent Application No. 10-2020-0093488 filed on Jul. 28, 2020, the entire contents of which are incorporated herein by reference.

FIELD

The present disclosure relates to a manufacturing system of a vehicle body component.

BACKGROUND

The statements in this section merely provide background information related to the present disclosure and may not constitute prior art.

In general, vehicle parts/components have been continuously increased in strength and reduced in weight in order to achieve high fuel economy. In addition, in some of the vehicle components, a local region is strengthened due to its structural characteristics.

Conventionally, a heat treatment apparatus has been disclosed, which promotes local reinforcement of a press panel while heating and cooling a local region of the press panel press-molded in a predetermined shape.

However, conventionally, as some regions of the press panel are clamped and heat treated, the size of the final product may be excessively deformed, and it is difficult to check the heating/cooling unit of the press panel and set the heat treatment condition.

The above information disclosed in this Background section is only for enhancement of understanding of the background of the invention, and therefore it may contain information that does not form the prior art that is already known in this country to a person of ordinary skill in the art.

SUMMARY

An exemplary heat treatment apparatus for a vehicle body component according to one form of the present disclosure includes, i) a jig base, ii) a lower fixed die fixedly installed on the jig base and supporting the vehicle body component that is press-molded into a predetermined shape, iii) a heating unit installed on the lower fixed die and locally heating the vehicle body component, iv) side movable dies respectively disposed at both sides of the lower fixed die, installed on the jig base to be capable of reciprocal movement, and selectively combinable with the lower fixed die, v) a cooling unit installed on each side movable die and cooling a heating portion of the vehicle body component, and vi) an upper movable die installed to be capable of reciprocal movement in an up and down direction correspondingly to the lower fixed die, and configured to clamp the vehicle body component through the lower fixed die and the side movable die combined together.

In addition, according to a heat treatment apparatus for a vehicle body component according to one form of the present disclosure, the heating unit may locally induction-heats a portion of the vehicle body component by supplying an electrical power to an induction coil.

In addition, according to a heat treatment apparatus for a vehicle body component according to one form of the present disclosure, the cooling unit may directly inject a coolant toward a heating portion of the vehicle body component.

In addition, a heat treatment apparatus for a vehicle body component according to one form of the present disclosure may further include, a first driving power source installed on the jig base and connected to the side movable die, and a second driving power source installed on a jig frame above the jig base and connected to the upper movable die.

In addition, an exemplary heat treatment apparatus is for local heat treatment of, as an induction heating object, a vehicle body component that is press-molded into a predetermined shape, and may include, i) a lower fixed die fixedly install on a jig base and supporting a lower surface of the induction heating object, ii) an induction coil installed on the lower fixed die and disposed at a predetermined gap with a heating portion of the induction heating object, iii) side movable dies respectively disposed at both sides of the lower fixed die, installed on the jig base to be capable of reciprocal movement, selectively combinable with the lower fixed die, and supporting both edge portions of the induction heating object, iv) a plurality of coolant injection members installed on each of the side movable dies and injecting coolant to the heating portion of the induction heating object, and v) an upper movable die installed to be capable of reciprocal movement in an up and down direction correspondingly to the lower fixed die, and configured to clamp the induction heating object through the lower fixed die and the side movable die combined together.

In addition, a heat treatment apparatus for a vehicle body component according to one form of the present disclosure may further include a mounting bracket that is installed on top of the lower fixed die, configured to fix the induction coil, and made of a heat insulating material.

In addition, according to a heat treatment apparatus for a vehicle body component according to one form of the present disclosure, the lower fixed die may form a first loading portion supporting the lower surface of the induction heating object on an upper surface of the lower fixed die.

In addition, according to a heat treatment apparatus for a vehicle body component according to one form of the present disclosure, the lower fixed die may consecutively form channels and ribs along a length direction on both sides of the lower fixed die having the first loading portion interposed.

In addition, according to a heat treatment apparatus for a vehicle body component according to one form of the present disclosure, the mounting bracket may be mounted on the channel.

In addition, according to a heat treatment apparatus for a vehicle body component according to one form of the present disclosure, the lower fixed die may include a first loading portion provided on the upper surface correspondingly to a shape of the induction heating object, and configured to support the lower surface of the induction heating object.

In addition, according to a heat treatment apparatus for a vehicle body component according to one form of the present disclosure, the upper movable die may include a first clamping portion formed on the lower surface correspondingly to the first loading portion.

In addition, according to a heat treatment apparatus for a vehicle body component according to one form of the present disclosure, the first loading portion may include, a first portion supporting a first end portion of the induction heating object, a second portion supporting a second end portion of the induction heating object, and a third portion connecting the first and second portions and supporting a lower surface between the first end portion and the second end portion of the induction heating object.

In addition, according to a heat treatment apparatus for a vehicle body component according to one form of the present disclosure, the induction coil may be formed along at least two predetermined routes correspondingly to the induction heating object.

In addition, according to a heat treatment apparatus for a vehicle body component according to one form of the present disclosure, the side movable die may include a second loading portion provided on an upper surface correspondingly to the shape of the induction heating object, and configured to support a respective edge portion of the induction heating object.

In addition, according to a heat treatment apparatus for a vehicle body component according to one form of the present disclosure, the upper movable die may include a second clamping portion formed on the lower surface correspondingly to the second loading portion.

In addition, according to a heat treatment apparatus for a vehicle body component according to one form of the present disclosure, the lower fixed die may include, a body portion corresponding to a lower surface shape of the induction heating object, and wing portions respectively extending from first end portion and second end portion of the body portion in both directions.

In addition, according to a heat treatment apparatus for a vehicle body component according to one form of the present disclosure, the side movable die may include, a first combining portion combinable with the body portion between the wing portions, and second combining portions formed at the first end portion and the second end portion of the first combining portion, and combinable with the wing portions.

In addition, according to a heat treatment apparatus for a vehicle body component according to one form of the present disclosure, a first combining surface combinable with first combining portion may be formed on the body portion.

In addition, according to a heat treatment apparatus for a vehicle body component according to one form of the present disclosure, second combining surfaces combinable with the second combining portions may be formed on the wing portions.

In addition, according to a heat treatment apparatus for a vehicle body component according to one form of the present disclosure, the coolant injection member may include, a nipple portion installed in a coolant supply hole penetrating the side movable dies, and connected to the coolant supply hole, and a nozzle portion connected to the nipple portion in a swivel rotatable manner.

In addition, according to a heat treatment apparatus for a vehicle body component according to one form of the present disclosure, the lower fixed die may include a coolant drain portion provided at both sides of the lower fixed die and forming a coolant exhaust passages when the lower fixed die is combined with the side movable dies.

According to one form of the present disclosure, the degree of freedom in the heat treatment condition with respect to the induction heating object may be improved, and thus the processing quality of a vehicle body component such as a vehicle panel may be improved. In addition, the amount of dimensional deformation caused by the heat deformation of the induction heating object may be reduced, and deviation of dimension may be maintained within a minimal tolerance.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
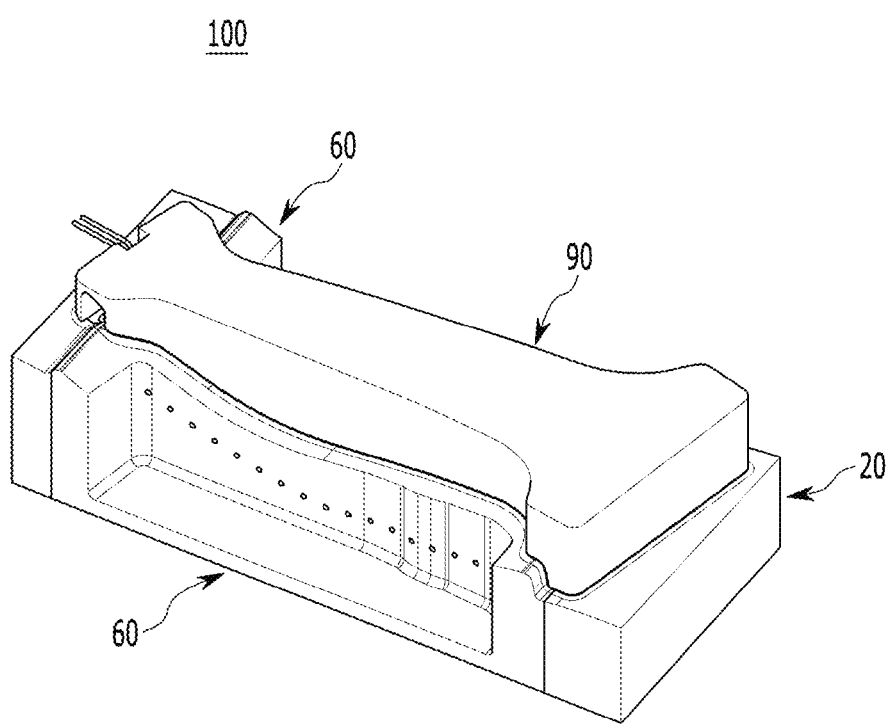
FIG. 1 to FIG. 3 are respectively a perspective view of a heat treatment apparatus for a vehicle body component according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, the present disclosure will be described more fully hereinafter with reference to the accompanying drawings, in which exemplary forms of the present disclosure are shown. As those skilled in the art would realize, the described forms may be modified in various different ways, all without departing from the spirit or scope of the present disclosure.

In order to clarify the present disclosure, parts that are not related to the description will be omitted, and the same elements or equivalents are referred to with the same reference numerals throughout the specification.

Also, the size and thickness of each element are arbitrarily shown in the drawings, but the present disclosure is not necessarily limited thereto, and in the drawings, the thickness of layers, films, panels, regions, etc., are exaggerated for clarity.

In addition, in the following description, dividing names of components into first, second, and the like is to divide the names because the names of the components are the same as each other and an order thereof is not particularly limited, In addition, unless explicitly described to the contrary, the word "comprise" and variations such as "comprises" or "comprising", will be understood to imply the inclusion of stated elements but not the exclusion of any other elements.

Furthermore, each of terms, such as " . . . unit", " . . . means", " . . . part", and " . . . member" described in the specification, mean a unit of a comprehensive element that performs at least one function or operation.

Figure 2:
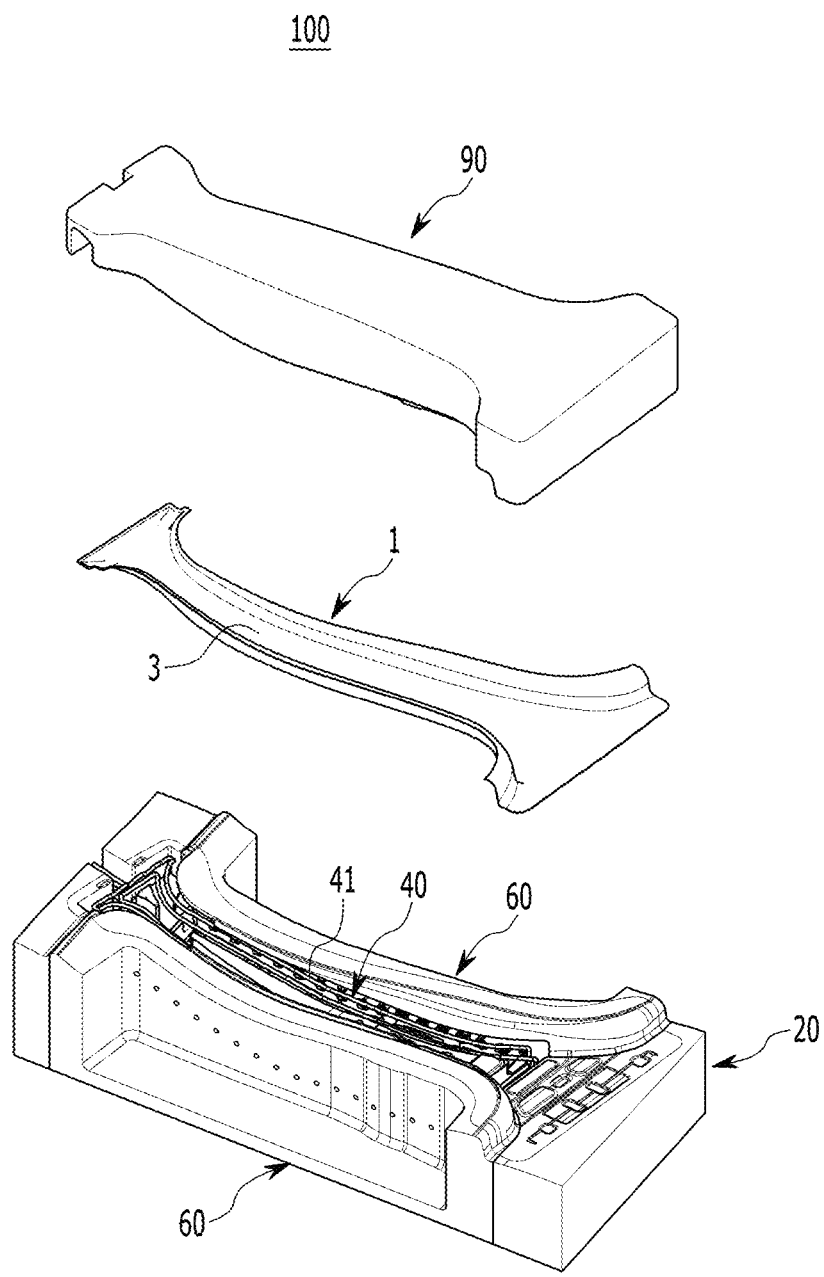
Figure 3:
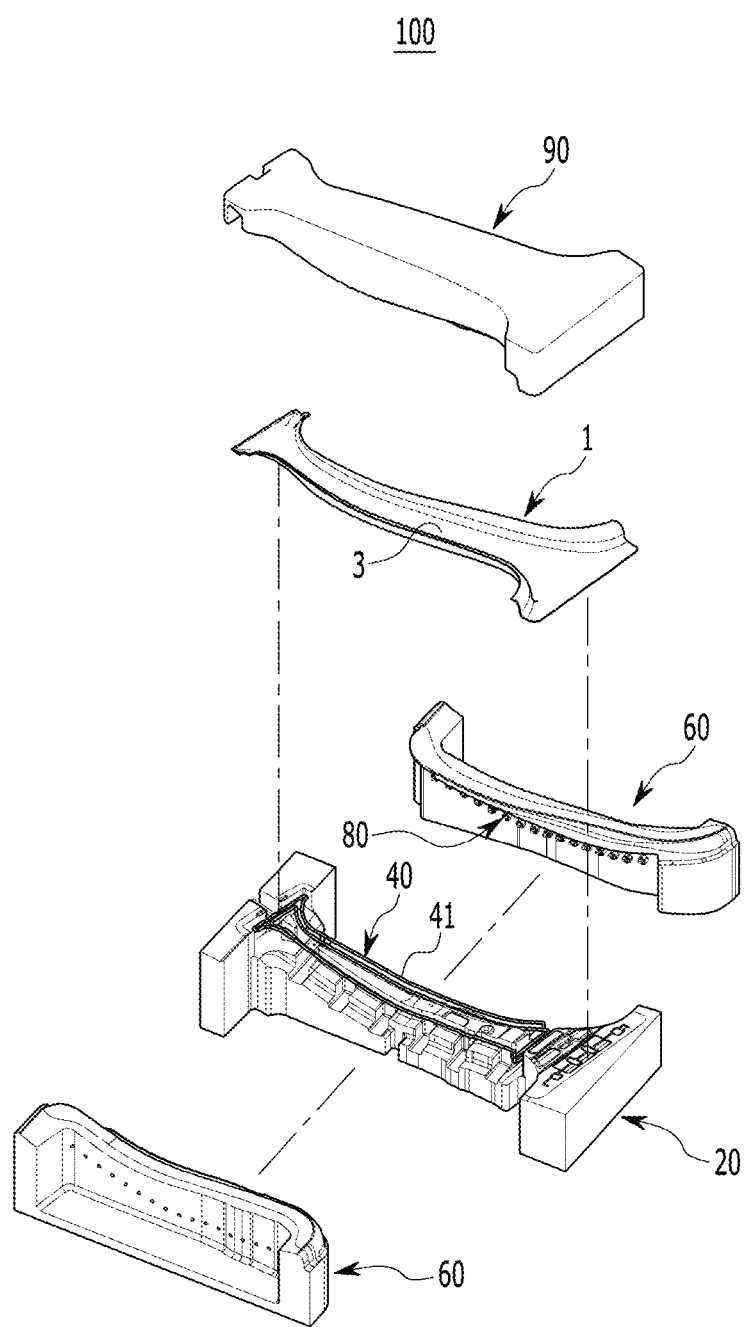

FIG. 1 to FIG. 3 are respectively a perspective view of a heat treatment apparatus for a vehicle body component according to one form of the present disclosure.

Referring to FIG. 1 to FIG. 3, a heat treatment apparatus 100 for a vehicle body component according to one form of the present disclosure may be applied to a sub-assemble line for manufacturing a vehicle body component 1 such as a vehicle body panel in a vehicle body factory.

In the sub-assemble line, a draw forming process, a trim process, a piercing process, a flange banding process, a forming process, a heat treatment process, etc. are performed to shape and process the raw material panel as a blank into a predetermined shape.

One form of the present disclosure may be applied to a process of forming and processing a vehicle body component 1 as a collision member such as a center pillar, a roof rail, bumper, and an impact beam into a predetermined shape in the sub-assemble line.

In addition, one form of the present disclosure may be applied to the process of press-molding and processing the center pillar outer panel 3 shown in FIG. 2 and FIG. 3, as the vehicle body component 1, into a predetermined shape.

Furthermore, according to one form of the present disclosure, a local region of the vehicle body component 1 press-molded into a predetermined shape is performed with a heat treatment process for heating and rapidly cooling by a heat treatment apparatus 100 for a vehicle body component according to one form of the present disclosure, and such may be applied to a manufacturing the vehicle body component 1 of which the local region is reinforced into a high strength.

However, the scope of the present disclosure should not be understood as being limited to manufacturing the vehicle body component 1, such as the center pillar outer panel 3, and manufacturing metal panel components employed in structures of various types and uses may be applied with the technical idea of the present disclosure.

Hereinafter, a length direction of the vehicle body component 1 is defined as the front and rear direction, and a direction vertical to the front and rear direction is defined as both directions and up and down direction. However, the definition of the direction has a relative meaning, and the direction may vary depending on the reference position of the apparatus 100 and the reference position of the vehicle body component 1, so the above reference direction is not limited to the reference direction of the present exemplary form.

In addition, hereinafter, an "end (one end, another end, and the like)" may be defined as any one end or may be defined as a portion (one end portion, another end portion, and the like) including that end.

A heat treatment apparatus 100 for a vehicle body component according to one form of the present disclosure performs a heat treatment process for induction-heating and cooling the local region of the vehicle body component 1 that is press-molded, and may be structured such that the dimensional transformation of the vehicle body component 1 may be reduced, and inspection and setting may become easy.

Hereinafter, the vehicle body component 1 press-mold as described above is referred to as an induction heating object, and the same reference numeral as the vehicle body component 1 is assigned to the induction heating object. Hereinafter, the vehicle body component 1 press-molded as described above is referred to as an induction heating object, and the same reference numeral for the induction heating object is assigned to the vehicle body component 1.

Figure 4:
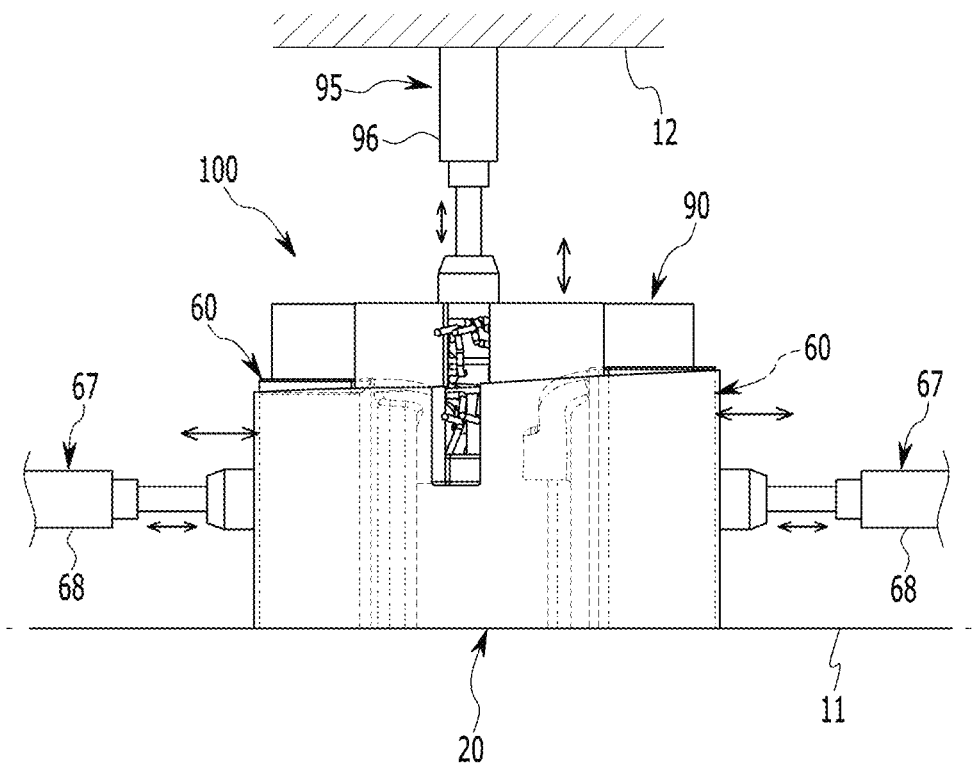
FIG. 4 is a front view of a heat treatment apparatus for a vehicle body component according to one form of the present disclosure.
Figure 5:
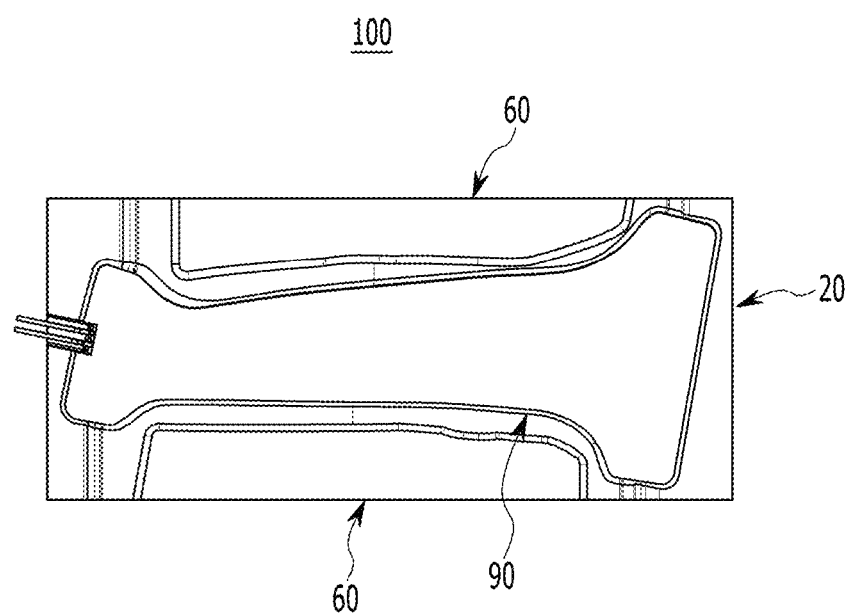
FIG. 5 is a plan view of a heat treatment apparatus for a vehicle body component according to one form of the present disclosure.
Figure 6:
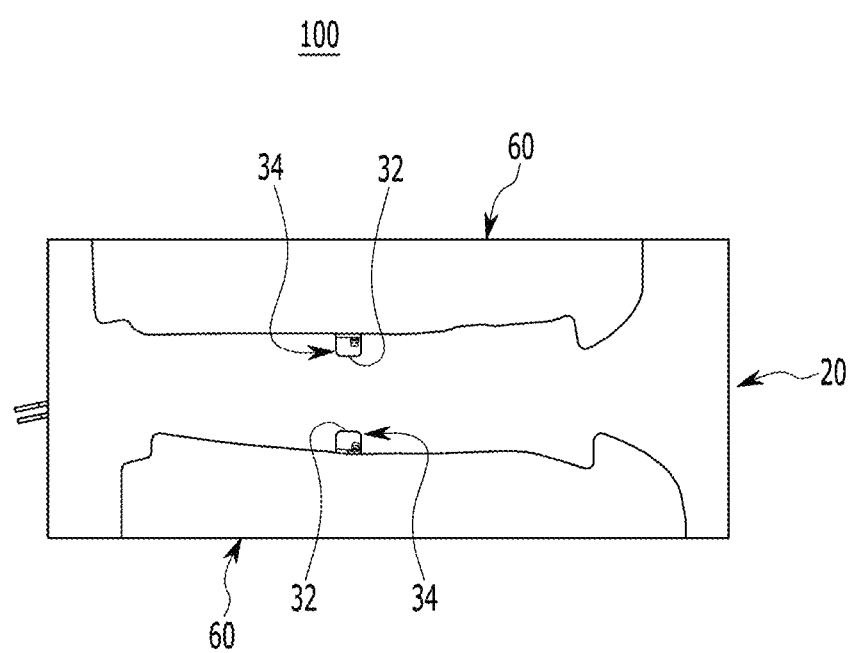
FIG. 6 is a bottom view of a heat treatment apparatus for a vehicle body component according to one form of the present disclosure.

FIG. 4 is a front view of a heat treatment apparatus for a vehicle body component, FIG. 5 is a plan view of a heat treatment apparatus for a vehicle body component, and FIG. 6 is a bottom view of a heat treatment apparatus for a vehicle body component according to one form of the present disclosure.

Referring to FIG. 1 to FIG. 6, a heat treatment apparatus 100 for a vehicle body component according to one form of the present disclosure includes a lower fixed die 20, a heating unit 40, a side movable die 60, a cooling unit 80, and an upper movable die 90.

The constituent elements as described above are configured in a fixture of, e.g., a jig base 11 and a jig frame 12. The jig base 11 is installed on a floor of a work area, and the jig frame 12 is installed above the jig base 11 apart from each other.

The jig base 11 and the jig frame 12 are for installing various constituent elements to be described below, and may be configured as a frame divided into one frame or two or more component frames.

The jig base 11 and the jig frame 12 may include various accessory elements to support constituent elements, such as a bracket, bar, a rod, a plate, a housing, a case, a block, a bulkhead, a rib, a rail, and a collar.

However, since the above-described various accessory elements are for installing constituent elements to be described below in the jig base 11 and the jig frame 12, in one form of the present disclosure, the accessory elements described above are collectively referred to as the jig base 11 and the jig frame 12, except for explicitly described otherwise.

In one form of the present disclosure, the lower fixed die 20 supports an induction heating object 1 and is fixedly installed on the jig base 11. The lower fixed die 20 supports a lower forming surface of the induction heating object 1, and in one form of the present disclosure, may be defined as a center mold.

Figure 7:
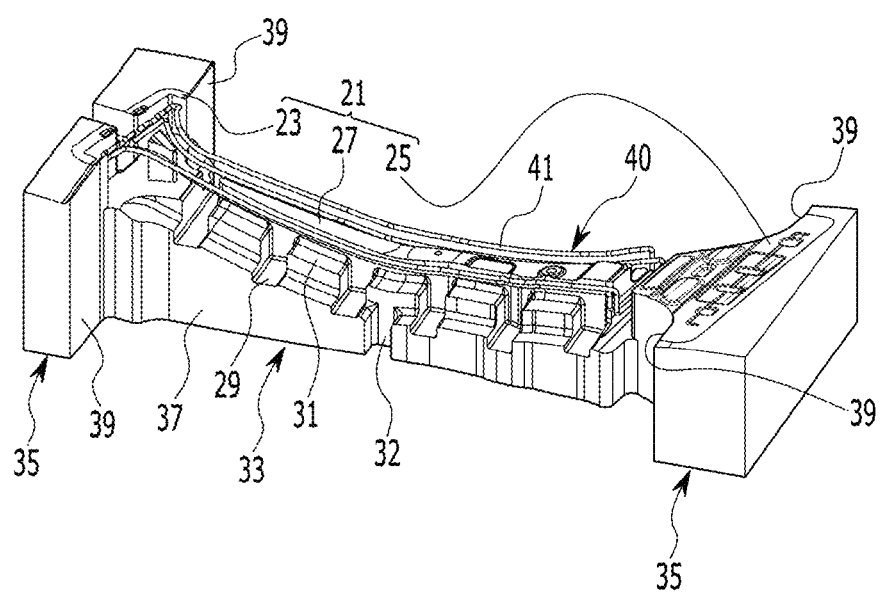
FIG. 7 illustrates a lower fixed die applied to a heat treatment apparatus for a vehicle body component according to one form of the present disclosure.

As shown in FIG. 7, the lower fixed die 20 includes a first loading portion 21 that supports a lower surface of the induction heating object 1 (refer to FIG. 2 and FIG. 3). The lower fixed die 20 is formed on an upper surface of the lower fixed die 20, along a length direction of the induction heating object 1 of the first loading portion 21.

The first loading portion 21 includes a first portion 23, a second portion 25, and a third portion 27. The first portion 23 supports a forward end portion (first end portion) of the induction heating object 1, and is provided on a forward upper surface of the lower fixed die 20.

The second portion 25 supports a rearward end portion (second end portion) of the induction heating object 1, and is provided on a rearward upper surface of the lower fixed die 20. In addition, the third portion 27 is provided on the upper surface between the forward and rearward upper surfaces of the lower fixed die 20. The third portion 27 connects the first and second portions 23 and 25, and supports a lower surface between the first and second end portions of the induction heating object 1.

In addition, the lower fixed die 20 consecutively forms channels 29 and ribs 31 along the length direction on both sides thereof with the first loading portion 21 interposed therebetween.

Furthermore, the lower fixed die 20 as described above includes a body portion 33 and wing portions 35. The body portion 33 is a portion forming the third portion 27 of the first loading portion 21, and is provided in a shape corresponding to the lower surface along the length direction of the induction heating object 1.

In addition, the wing portions 35 are integrally connected to the first end portion (the forward end portion) and the second end portion (the rearward end portion) of the body portion 33, respectively, and extend from the first end portion and the second end portion of the body portion 33 in both directions. The wing portions 35 form first and second portions 23 and 25 of the first loading portion 21, respectively.

Referring to FIG. 2 and FIG. 3, in one form of the present disclosure, the heating unit 40 is for locally heating a predetermined local region (hereinafter, referred to as a heating portion, for convenience of description) of the induction heating object 1. The heating unit 40 is installed on top of the lower fixed die 20.

The heating unit 40 includes an induction coil 41 for induction-heating the (local) heating portion of the induction heating object 1 when power is supplied. The induction coil 41 is disposed on top of the lower fixed die 20 with a predetermined gap with the heating portion of the induction heating object 1.

Here, the term induction-heating is to heat a metal object using the principle of electromagnetic induction of high frequency current. When current is applied, the induction coil 41 generates eddy current in the heating portion of the induction heating object 1 to be heated, and may heat the heating portion by Joule heating generated by the resistance of the metal.

The induction coil 41 is disposed along a predetermined route corresponding to the heating portion of the induction heating object 1, and thus, may be disposed along at least two routes, which may be arranged at predetermined intervals.

Figure 8:
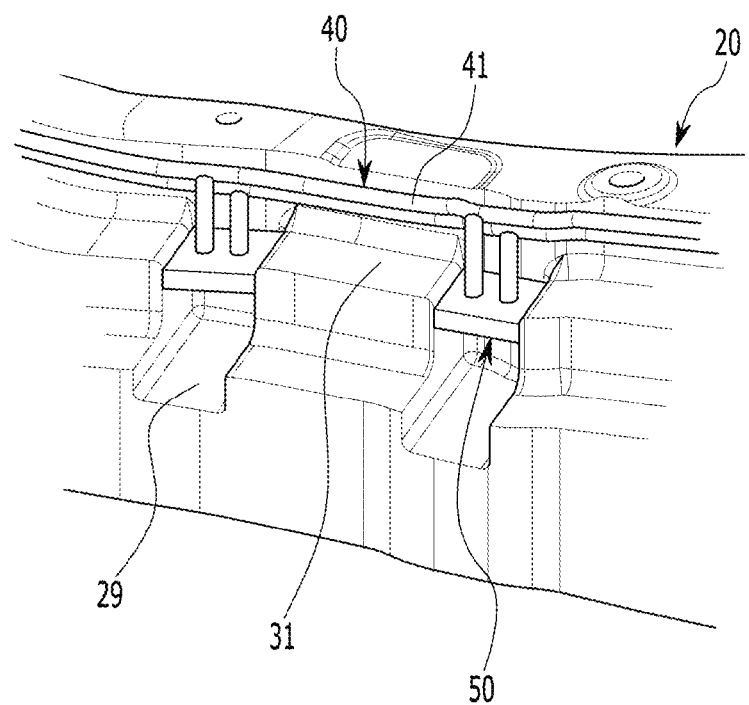
FIG. 8 illustrates a induction coil applied to a heat treatment apparatus for a vehicle body component according to one form of the present disclosure.

The induction coil 41 has a hollow pipe shape, for example, a copper pipe made of copper material may be applied. As shown in FIG. 7 and FIG. 8, the induction coil 41 is mounted on the channel 29 of the lower fixed die 20, and may be disposed along the heating portion of the induction heating object 1.

For such a purpose, in one form of the present disclosure, a mounting bracket 50 is employed, for mounting (fixing) the induction coil 41 to the channel 29 above the lower fixed die 20.

The mounting bracket 50 is made of a high temperature resistant insulating material, for example, a ceramic material, and is fixedly installed in the channel 29 of the lower fixed die 20. The mounting bracket 50 may fix the induction coil 41 through a fastener such as a bolt and nut (not shown).

Referring to FIG. 1 to FIG. 6, in one form of the present disclosure, the side movable die 60 is provided at both sides of the lower fixed die 20, and is installed on the jig base 11 to be capable of reciprocal movement. Thus, two side movable dies 60 are selectively combined with both sides of the lower fixed die 20.

The side movable dies 60 supports both edge portions of the induction heating object 1 while being combined with the both sides of the lower fixed die 20. In one form of the present disclosure, the side movable die 60 may be called a side mold.

Figure 9:
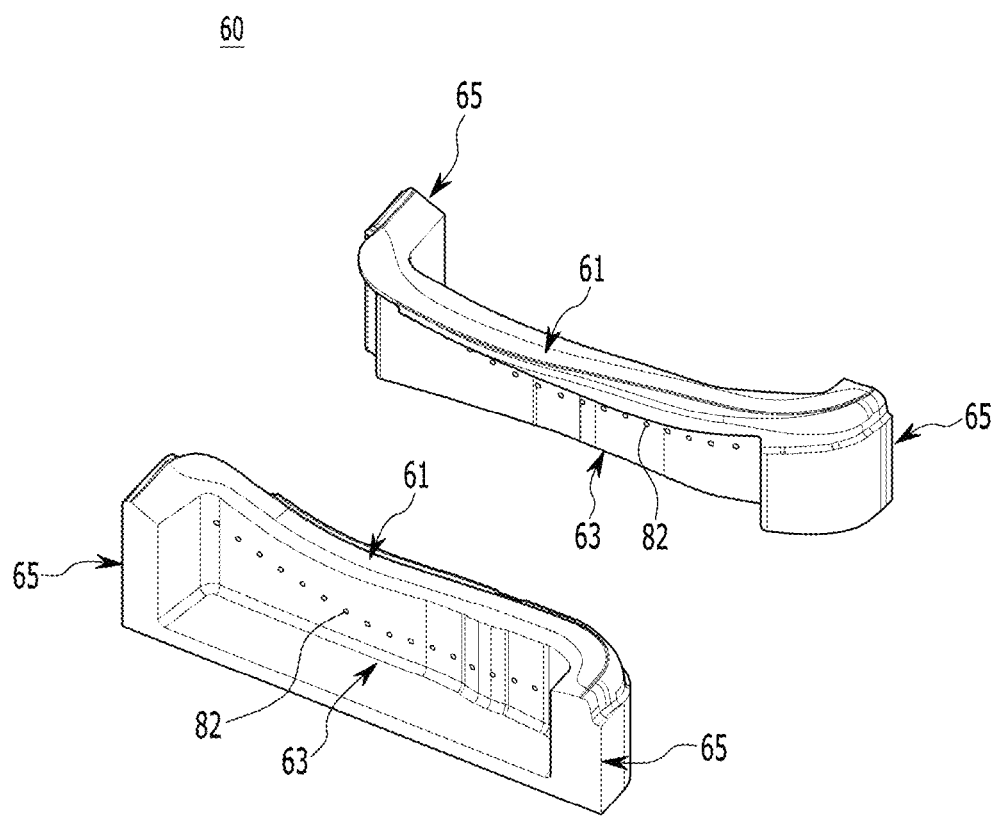
FIG. 9 illustrates a side movable die applied to a heat treatment apparatus for a vehicle body component according to one form of the present disclosure.

As shown in FIG. 9, the side movable die 60 further includes a second loading portion 61 provided on the upper surface thereof, in a shape corresponding to a shape of the induction heating object 1. The second loading portion 61 supports both edge portions along the length direction of the induction heating object 1, respectively.

Furthermore, the side movable die 60 further includes a first combining portion 63 and a second combining portion 65 that may be combined on both sides of the lower fixed die 20 (refer to FIG. 7). The first combining portion 63 is a portion corresponding to the body portion 33 of the lower fixed die 20, and may be combined with both sides of the body portion 33 between the wing portions 35 of the lower fixed die 20.

In addition, the second combining portion 65 is a portion corresponding to the wing portions 35 of the lower fixed die 20, and is integrally connected to a first end portion (forward end portion) and a second end portion (rearward end portion) of the first combining portion 63. The second combining portion 65 may be combined with the wing portions 35 of the lower fixed die 20 along both directions.

Here, a first combining surface 37 combinable with the first combining portion 63 of the side movable die 60 is formed on the body portion 33 of the lower fixed die 20. In addition, a second combining surface 39 combinable with the second combining portion 65 of the side movable die 60 is formed on the wing portion 35 of the lower fixed die 20.

Meanwhile, as shown in FIG. 4, the side movable die 60 is provided at both sides of the lower fixed die 20, and is installed on the jig base 11 to be capable of moving in both directions by a first driving power source 67.

That is, with the lower fixed die 20 between the side movable dies 60, the side movable dies 60 may move toward the lower fixed die 20 by the first driving power source 67 to be combined with both sides of the lower fixed die 20. In addition, the side movable dies 60 may move away from the lower fixed die 20 by the first driving power source 67 to be separated from the lower fixed die 20.

Here, the first driving power source 67 may include an operation cylinder 68 of a known technology that is fixedly installed on the jig base 11. The operation cylinder 68 is connected to each of the side movable dies 60 through an operation rod that operates backwards and forwards by hydraulic pressure or pneumatic pressure.

Referring to FIG. 3, in one form of the present disclosure, the cooling unit 80 is for (rapidly) cooling the heating portion of the induction heating object 1 induction-heated by the induction coil 41.

Figure 10:
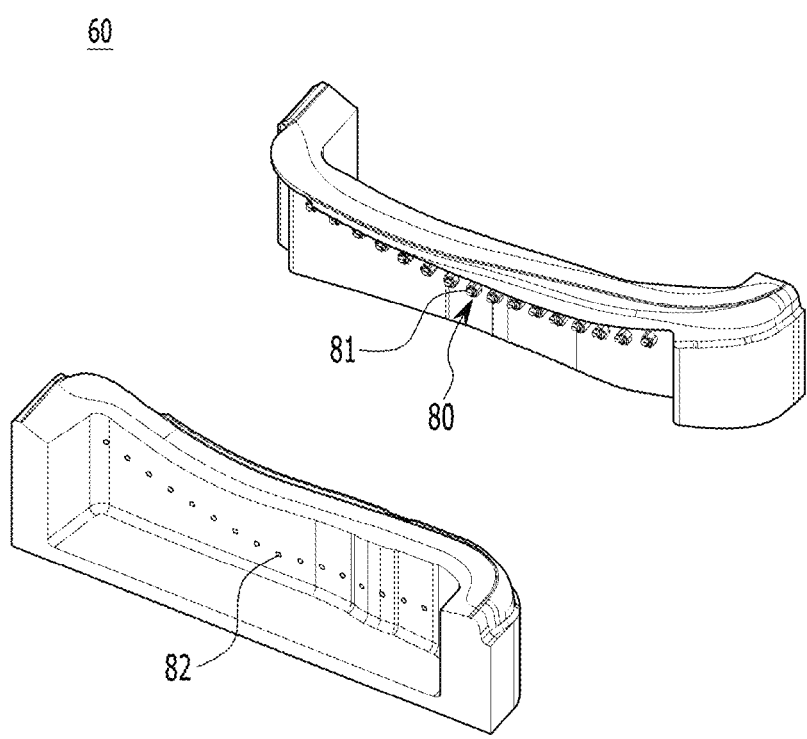
FIG. 10 illustrates a coupling structure of a side movable die and a coolant injection member applied to a heat treatment apparatus for a vehicle body component according to one form of the present disclosure.
Figure 11:
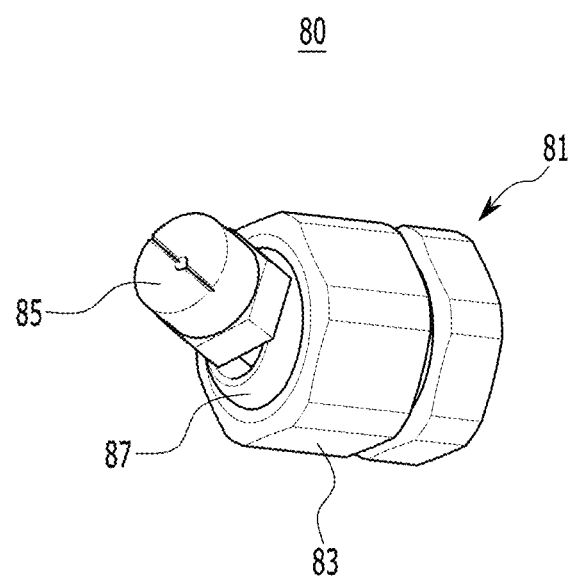
FIG. 11 illustrates a coolant injection member applied to a heat treatment apparatus for a vehicle body component according to one form of the present disclosure.

As shown in FIG. 10 and FIG. 11, the cooling unit 80 includes a plurality of coolant injection members 81 installed in each of the side movable dies 60. The coolant injection members 81 may directly injects the coolant to the heating portion of the induction heating object 1 to rapidly cool the heating portion.

The coolant injection members 81 are installed in coolant supply holes 82 that penetrate the side movable dies 60 and formed toward the lower fixed die 20 (refer to FIG. 3). Here, the coolant supply holes 82 are aligned on the side movable dies 60 along the heating portion of the induction heating object 1.

The coolant injection member 81 includes a nipple portion 83 and a nozzle portion 85. The nipple portion 83 is installed in the coolant supply holes 82 of the side movable die 60. The nipple portion 83 forms a hydraulic line connected to the coolant supply hole 82.

In addition, the nozzle portion 85 is a nozzle body that substantially injects a coolant, and forms a nozzle passage connected to the hydraulic line of the nipple portion 83. The nozzle portion 85 is connected to the nipple portion 83 in a swivel rotatable manner.

The nozzle portion 85 is connected to the nipple portion 83 in a swivel rotatable manner through a ball joint 87. Accordingly, the nozzle portion 85 may swivel through the ball joint 87 at the nipple portion 83, and a spray angle of the coolant may be adjusted.

Meanwhile, the lower fixed die 20 as shown in FIG. 7 forms a coolant drain portion 32 to exhaust the coolant. The coolant drain portion 32 is provided in the form of a groove along the up and down direction on both sides of the lower fixed die 20.

As shown in FIG. 6, while the side movable die 60 is combined on both sides of the lower fixed die 20, the coolant drain portion 32 may form a coolant exhaust passage 34 that exhausts the coolant to a predetermined region.

Referring to FIG. 1 to FIG. 6, in one form of the present disclosure, the upper movable die 90 is installed to be capable of reciprocal movement in the up and down direction correspondingly to the lower fixed die 20 disposed underneath.

The upper movable die 90 is installed on the jig frame 12 above the jig base 11 to be capable of reciprocal movement in the up and down direction, and in one form of the present disclosure, the upper movable die 90 may be called an upper mold.

The upper movable die 90 may clamp by pressurizing the induction heating object 1, through the first loading portion 21 (refer to FIG. 7) of the lower fixed die 20 and the second loading portion 61 (refer to FIG. 9) of the side movable die 60 that are combined together.

Figure 12:
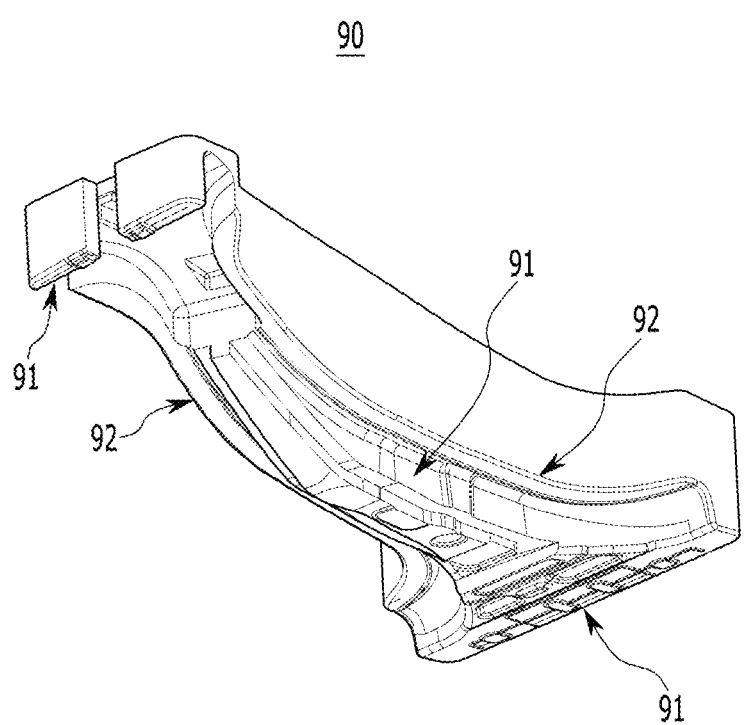
FIG. 12 illustrates a side movable die applied to a heat treatment apparatus for a vehicle body component according to one form of the present disclosure.

As shown in FIG. 12, the upper movable die 90 includes a first clamping portion 91 and a second clamping portion 92 provided on a lower surface of the upper movable die 90.

The first clamping portion 91 is formed to protrude on the lower surface of the upper movable die 90 in a downward direction correspondingly to the first loading portion 21 of the lower fixed die 20.

From above the lower fixed die 20, the first clamping portion 91 pressurizes an upper surface side and both lateral sides of the induction heating object 1 disposed on the first loading portion 21 of the lower fixed die 20.

The second clamping portion 92 is planarly formed on the lower surface of the upper movable die 90 and at both sides interposing the first clamping portion 91, correspondingly to the second loading portion 61 of the side movable die 60. From above the side movable die 60, the second clamping portion 92 pressurizes both edge portions of the induction heating object 1 disposed on the second loading portion 61 of the side movable die 60.

Meanwhile, as shown in FIG. 4, the upper movable die 90 is movable in the up and down direction by a second driving power source 95 correspondingly to the lower fixed die 20.

Here, the second driving power source 95 may include an operation cylinder 96 of a known technology that is fixedly installed on the jig frame 12. The operation cylinder 96 is connected to the upper movable die 90 through an operation rod that operates backwards and forwards by hydraulic pressure or pneumatic pressure.

Hereinafter, an operation of the heat treatment apparatus 100 for a vehicle body component according to one form of the present disclosure is described in detail with reference to the drawings.

Figure 13:
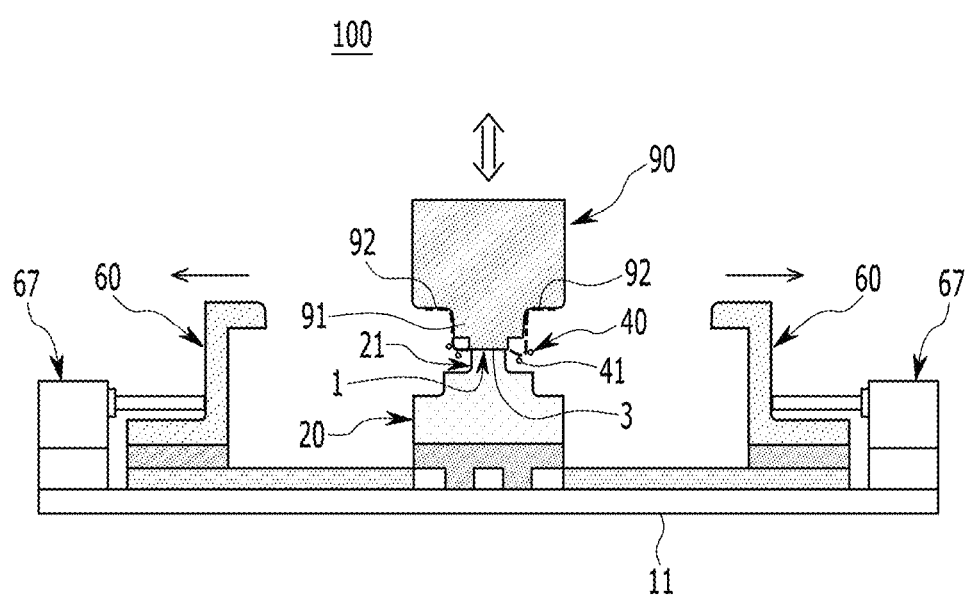
FIG. 13 to FIG. 15 illustrate an operation of a heat treatment apparatus for a vehicle body component according to one form of the present disclosure.
Figure 14:
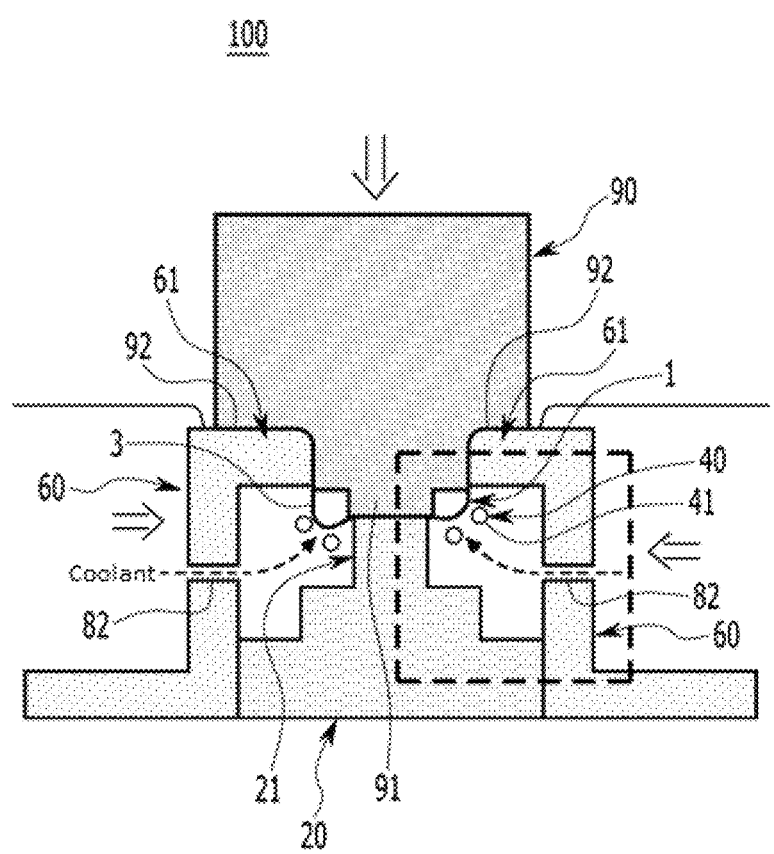
Figure 15:
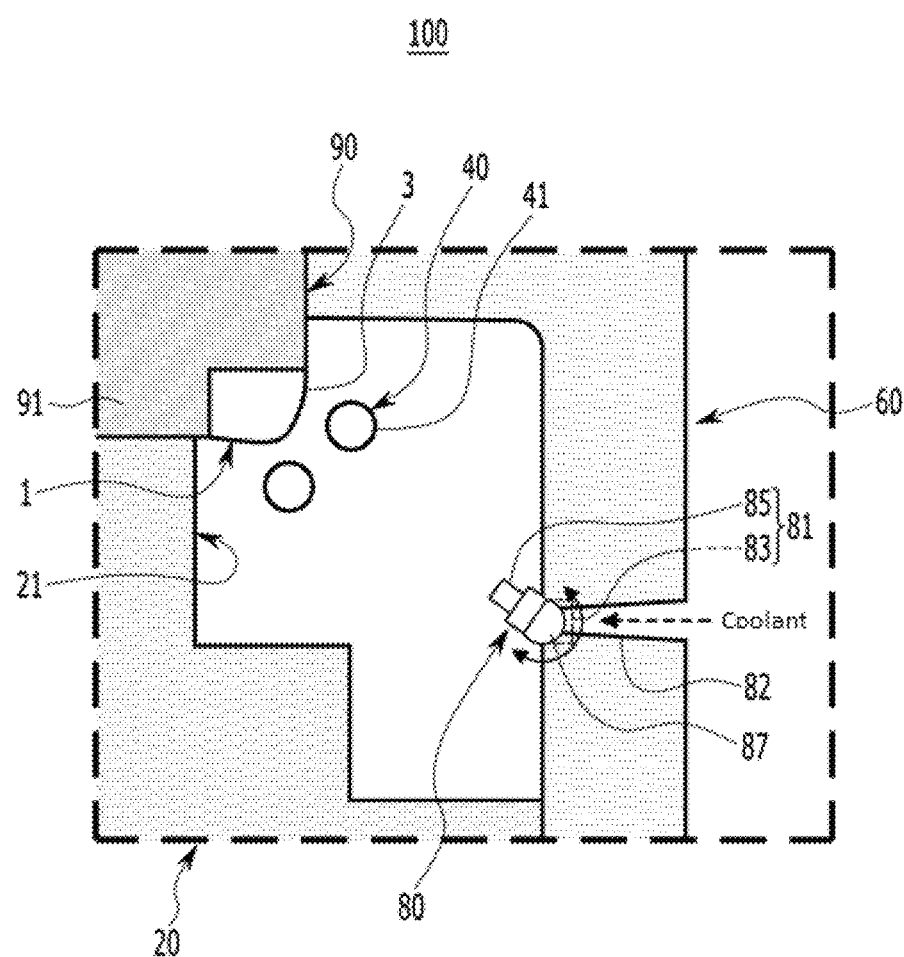

FIG. 13 to FIG. 15 illustrate an operation of a heat treatment apparatus for a vehicle body component according to one form of the present disclosure.

First, in one form of the present disclosure, the induction heating object 1 is provided as a vehicle body component that is pressed-molded into a predetermined shape.

Here, as shown in FIG. 13, the side movable die 60 is disposed on the jig base 11 interposing the lower fixed die 20, and has moved farther (i.e., backward) from the lower fixed die 20 by the first driving power source 67. In addition, the upper movable die 90 has moved upward correspondingly to the lower fixed die 20 by the second driving power source 95.

In such a state, in one form of the present disclosure, the induction heating object 1 is loaded on the first loading portion 21 of the lower fixed die 20. At this time, the first portion 23 of the first loading portion 21 supports the forward end portion (the first end portion) of the induction heating object 1, the second portion 25 supports the rearward end portion (the second end portion) of the induction heating object 1, and the third portion 27 supports the lower surface between the first end portion and the second end portion of the induction heating object 1.

Then, in one form of the present disclosure, the upper movable die 90 is moved downward by the operation of the second driving power source 95, and the upper surface side of the induction heating object 1 is pressurized by the first clamping portion 91 of the upper movable die 90.

After the above process, in one form of the present disclosure, it is checked whether interference occurs between the heating portion of the induction heating object 1 and the induction coil 41 of the heating unit 40, and a distance between the heating portion and the induction coil 41 is measured.

Here, when the distance between the induction coil 41 and the heating portion of the induction heating object 1 is different from a predetermined gap, in one form of the present disclosure, the mount position of the induction coil 41 with respect to the lower fixed die 20 is adjusted, to vary heating condition of the induction heating object 1 for the induction coil 41.

In addition, in one form of the present disclosure, according to the change of the heating condition of the induction heating object 1 by the induction coil 41, the coolant injection angle of the coolant injection members 81 with respect to the cooling unit 80 is adjusted. At this time, in one form of the present disclosure, the nozzle portion 85 of the coolant injection member 81 is swiveled, and the coolant injection angle may be adjusted.

Therefore, in one form of the present disclosure, through the inspection and adjustment of the heating unit 40 and the cooling unit 80 as described above, the heating condition may be set to optimally heat and cool the heating portion of the induction heating object 1.

Then, in one form of the present disclosure, the upper movable die 90 moved upward by the operation of the second driving power source 95, and the induction heating object 1 is unloaded from the first loading portion 21 of the lower fixed die 20.

Subsequently, in one form of the present disclosure, as shown in FIG. 14, the side movable dies 60 are moved forward toward the lower fixed die 20 at a center of the side movable dies 60 by the operation of the first driving power source 67.

Then, the side movable dies 60 are combined with both sides of the lower fixed die 20. Here, the first combining portions 63 of the side movable dies 60 are combined with the first combining surfaces 37 at the both sides of the body portion 33 between the wing portions 35 of the lower fixed die 20, and the second combining portions 65 are combined with the second combining surfaces 39 of the wing portions 35.

As the side movable dies 60 are combined with both sides of the lower fixed die 20, the coolant drain portions 32 at the both sides of the lower fixed die 20 are formed as the coolant exhaust passages 34 to exhaust the coolant.

Subsequently, in one form of the present disclosure, the induction heating object 1 is loaded on the first and second loading portions 21 and 61 of the lower fixed die 20 and the side movable die 60 combined together.

At this time, the first portion 23 of the first loading portion 21 supports the forward end portion (the first end portion) of the induction heating object 1, the second portion 25 supports the rearward end portion (the second end portion) of the induction heating object 1, and the third portion 27 supports a lower surface between the first end portion and the second end portion of the induction heating object 1. In addition, the second loading portion 61 supports both edge portions along the length direction of the induction heating object 1.

Then, in one form of the present disclosure, the upper movable die 90 is moved downward by the operation of the second driving power source 95, and the lower surface side of the induction heating object 1 placed on the first loading portion 21 is pressurized by the first clamping portion 91 of the upper movable die 90.

Simultaneously, in one form of the present disclosure, the both edge portions of the induction heating object 1 placed on the second loading portion 61 is pressurized through the second clamping portion 92 of the upper movable die 90.

Therefore, in one form of the present disclosure, as described above, an entire region of the induction heating object 1 placed on the first and second loading portions 21 and 61 of the lower fixed die 20 and the side movable dies 60 combined together may be clamped by the first and second clamping portions 91 and 92 and the upper movable die 90.

Subsequently, in one form of the present disclosure, by supplying an electrical power to the induction coil 41 of the heating unit 40, the heating portion of the induction heating object 1 is induction-heated for a predetermined time by the principle of electromagnetic induction of high frequency current.

In one form of the present disclosure, in a state in which the heating portion of the induction heating object 1 is induction-heated for the predetermined time as described above, the power applied to the induction coil 41 is cut off.

Then, in one form of the present disclosure, as shown in FIG. 15, the coolant is directly injected toward the heating portion of the induction heating object 1 through the nozzle portions 85 of the coolant injection members 81, and then the heating portion is rapidly cooled for a predetermined time.

In this process, the coolant supplied from a coolant supplier (not shown) inflows into the nipple portion 83 through the coolant supply holes 82 of the side movable die 60, and then is directly injected toward the heating portion of the induction heating object 1 through the nozzle portion 85.

Here, the nozzle portion 85 of the coolant injection members 81 may inject the coolant toward the heating portion of the induction heating object 1, in a position swiveled by the ball joint 87 to a predetermined angle with respect to the heating portion of the induction heating object 1.

In addition, the coolant flowing down after cooling the heating portion of the induction heating object 1 is exteriorly exhausted through the coolant exhaust passage 34.

After the heating portion of the induction heating object 1 is cooled in this way, in one form of the present disclosure, the upper movable die 90 is moved upward by the operation of the second driving power source 95, and the induction heating object 1 is unloaded from the lower fixed die 20 and the first and second loading portions 21 and 61 of the side movable die 60.

Therefore, in one form of the present disclosure, a local region of the induction heating object 1 may be induction-heated and cooled through a series of processes as described above, and a vehicle body component, such as a panel part, in which the local region is highly strengthened may be manufactured.

According to a heat treatment apparatus 100 for a vehicle body component according to one form of the present disclosure as described above, the lower fixed die 20 and the side movable dies 60 are separated before performing the heat treatment process of the induction heating object 1. In the state, the heating unit 40 and the cooling unit 80 may be set through inspection and adjustment to a condition for optimal heating and cooling the heating portion of the induction heating object 1.

In addition, in one form of the present disclosure, the entire region of the induction heating object 1 placed on the first and second loading portions 21 and 61 of the lower fixed die 20 and the side movable dies 60 combined together may be clamped by the first and second clamping portions 91 and 92 and the upper movable die 90.

Accordingly, in one form of the present disclosure, the degree of freedom in the heat treatment condition with respect to the induction heating object 1 may be improved, and thus the processing quality of a vehicle body component such as a vehicle panel may be improved.

In addition, in one form of the present disclosure, by processing the heat treatment while clamping the entire region of the induction heating object 1, the amount of dimensional deformation caused by the heat deformation of the induction heating object 1 may be reduced, and deviation of dimension may be maintained within a minimal tolerance.

Furthermore, in one form of the present disclosure, as the heating unit 40 and the cooling unit 80 are fixedly installed on the lower fixed die 20, the heat treatment of the induction heating object 1 may be performed by the heating unit 40 and the cooling unit 80 at the same time while the induction heating object 1 is restrained by the upper movable die 90. Therefore, it is possible to reduce the cycle time for manufacturing panel parts.

While the present disclosure has described what is presently considered to be practical exemplary forms, it is to be understood that the disclosure is not limited to the disclosed forms. On the contrary, it is intended to cover various modifications and equivalent arrangements included within the spirit and scope of the present disclosure.

DESCRIPTION OF SYMBOLS

1: a vehicle body component or induction heating object
3: pillar outer panel
11: jig base
12: jig frame
20: lower fixed die
21: first loading portion
23: first portion
25: second portion
27: third portion
29: channel
31: rib
32: coolant drain portion
33: body portion
34: coolant exhaust passage
35: wing portion
37: first combining surface
39: second combining surface
40: heating unit
41: induction coil
50: mounting bracket
60: side movable die
61: second loading portion
63: first combining portion
65: second combining portion
67: first driving power source
68, 96: operation cylinder
80: cooling unit
81: coolant injection member
82: coolant supply hole
83: nipple portion
85: nozzle portion
87: ball joint
90: upper movable die
91: first clamping portion
92: second clamping portion
95: second driving power source
100: heat treatment apparatus for a vehicle body component

What is claimed is:

1. A heat treatment apparatus for local heat treatment of a vehicle body component, the heat treatment apparatus comprising:
a lower fixed die fixedly installed on a jig base and configured to support a lower surface of the vehicle body component;
an induction coil installed on the lower fixed die for heating a heating portion of the vehicle body component;
a plurality of side movable dies disposed at both sides of the lower fixed die, installed on the jig base, and configured to support both edge portions of the vehicle body component, wherein the plurality of side movable dies is configured to move reciprocally and to selectively assemble with the lower fixed die;
a plurality of coolant injection members installed on each side moveable die of the plurality of side movable dies and configured to inject coolant to the heating portion of the vehicle body component; and
an upper movable die configured to move reciprocally in an up and down direction correspondingly to the lower fixed die, and clamp the vehicle body component through the lower fixed die and at least one side movable die of the plurality of side movable die assembled together.

2. The heat treatment apparatus of claim 1, further comprising: a mounting bracket that is installed on a top of the lower fixed die, configured to fix the induction coil, and made of a heat insulating material.

3. The heat treatment apparatus of claim 2, wherein:
the lower fixed die forms a first loading portion, an upper surface of the first loading portion configured to support the lower surface of the vehicle body component,
the lower fixed die consecutively forms a plurality of channels and ribs along a length direction on both sides of the lower fixed die having the first loading portion interposed, and
the mounting bracket is mount on the plurality of channels.

4. The heat treatment apparatus of claim 1, wherein:
the lower fixed die comprises a first loading portion having an upper surface forming a shape corresponding to a shape of the vehicle body component, and
the lower fixed die is configured to support the lower surface of the vehicle body component.

5. The heat treatment apparatus of claim 4, wherein the upper movable die comprises a first clamping portion formed on a lower surface of the upper movable die correspondingly to an upper surface of the first loading portion.

6. The heat treatment apparatus of claim 4, wherein the first loading portion comprises:
a first portion supporting a first end portion of the vehicle body component;
a second portion supporting a second end portion of the vehicle body component; and
a third portion connecting the first and second portions and supporting a lower surface between the first end portion and the second end portion of the vehicle body component.

7. The heat treatment apparatus of claim 1, wherein the induction coil is formed along at least two predetermined routes correspondingly to the vehicle body component.

8. The heat treatment apparatus of claim 1, wherein the plurality of side movable die comprises a second loading portion having an upper surface forming a shape corresponding to a shape of the vehicle body component, and configured to support a respective edge portion of the vehicle body component.

9. The heat treatment apparatus of claim 8, wherein the upper movable die comprises a second clamping portion formed on a lower surface of the upper movable die correspondingly to the second loading portion.

10. The heat treatment apparatus of claim 1, wherein the lower fixed die comprises:
a body portion corresponding to a lower surface shape of the vehicle body component; and
wing portions respectively extending from a first end portion and a second end portion of the body portion in both directions.

11. The heat treatment apparatus of claim 10, wherein the side movable die comprises:
a first combining portion configured to be assembled with the body portion between the wing portions; and
second combining portions configured to be assembled with the wing portions and formed at the first end portion and the second end portion of the first combining portion.

12. The heat treatment apparatus of claim 11, wherein:
a first combining surface configured to be assembled with first combining portion is formed on the body portion; and
second combining surfaces configured to be assembled with the second combining portions is formed on the wing portions.

13. The heat treatment apparatus of claim 1, wherein a coolant injection member of the plurality of coolant injection members comprises:
a nipple portion installed in a coolant supply hole penetrating at least one side movable die of the plurality of side movable dies, and connected to the coolant supply hole; and
a nozzle portion connected to the nipple portion in a swivel rotatable manner.

14. The heat treatment apparatus of claim 1, wherein the lower fixed die comprises a coolant drain portion provided at both sides of the lower fixed die and forms a coolant exhaust passages when the lower fixed die is assembled with the plurality of side movable dies.

* * * * *